(12) United States Patent
Tokura et al.

(10) Patent No.: US 6,866,612 B2
(45) Date of Patent: Mar. 15, 2005

(54) CONTROL DEVICE FOR AUTOMATIC TRANSMISSION

(75) Inventors: Takaaki Tokura, Toyota (JP); Katsumi Kono, Toyota (JP); Norimi Asahara, Aichi-ken (JP); Masataka Osawa, Nagoya (JP); Hiroyuki Nishizawa, Tajimi (JP); Ryoichi Hibino, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/319,612

(22) Filed: Dec. 16, 2002

(65) Prior Publication Data

US 2003/0125161 A1 Jul. 3, 2003

(30) Foreign Application Priority Data

Dec. 21, 2001 (JP) .......................... 2001-390241

(51) Int. Cl.$^7$ .............................................. B60K 41/02
(52) U.S. Cl. ........................ 477/176; 477/180; 477/107
(58) Field of Search ................................ 477/107, 110, 477/176, 180

(56) References Cited

U.S. PATENT DOCUMENTS

| | | | | |
|---|---|---|---|---|
| 5,056,378 A | * | 10/1991 | Aimone et al. ............. | 477/109 |
| 5,079,970 A | * | 1/1992 | Butts et al. .............. | 477/110 X |
| 5,360,381 A | * | 11/1994 | Swist ....................... | 477/180 X |
| 5,407,401 A | * | 4/1995 | Bullmer et al. ............. | 477/110 |

FOREIGN PATENT DOCUMENTS

| | | | |
|---|---|---|---|
| EP | 129417 | * | 12/1984 |
| JP | A 7-305763 | | 11/1995 |
| JP | A 9-249051 | | 9/1997 |
| JP | A 2000-97324 | | 4/2000 |
| JP | A 2000-97325 | | 4/2000 |
| JP | A 2000-170890 | | 6/2000 |

* cited by examiner

Primary Examiner—Ha Ho
(74) Attorney, Agent, or Firm—Oliff & Berridge, PLC

(57) ABSTRACT

In order to control slip amount of a disengagement side engagement device at the time of a gear shift operation, a target value Nr for rotational speed of an input shaft of an automatic transmission is calculated inside an input shaft speed target value calculating block. Slip control of the disengagement side engagement device is then carried out by controlling engine torque using an engine torque control amount obtained from a engine torque control amount estimation block and the clutch slip amount compensation value calculating section to cause rotation speed Nt of the input shaft to follow the target value Nr. In this way, responsiveness and precision of slip control of the disengagement side engagement device at the time of gear shift operation are improved, and it is possible to improve gear shift shock and to carry out a gear shift operation in a short period of time.

3 Claims, 5 Drawing Sheets

|  |  | CLUTCH | | | BRAKE | | | ONE-WAY CLUTCH | | VALVE | |
|---|---|---|---|---|---|---|---|---|---|---|---|
|  |  | C1 | C2 | C3 | B1 | B2 | B3 | F1 | F2 | SV1 | SV2 |
| P |  | X | X | X | X | X | X | X | X | O | O |
| R |  | X | X | O | X | X | O | X | X | O | O |
| N |  | X | X | X | X | X | X | X | X | O | O |
| D | 1ST | O | X | X | X | X | X | X | O | O | O |
| D | 2ND | O | X | X | X | O | X | O | X | O | X |
| D | 3RD | O | O | X | X | O | X | X | X | X | X |
| D | 4TH | X | O | X | O | O | X | X | X | X | O |
| 2 | 1ST | O | X | X | X | X | X | X | O | O | O |
| 2 | 2ND | O | X | X | O | O | X | O | X | O | X |
| 2 | 3RD | O | O | X | X | O | X | X | X | X | X |
| L | 1ST | O | X | X | X | X | O | X | O | O | O |
| L | 2ND | O | X | X | O | O | X | O | X | O | X |
| L | (3RD) | O | O | X | X | O | X | X | X | X | X |

FIG. 2

CONTROL DEVICE FOR AUTOMATIC TRANSMISSION

BACKGROUND OF THE INVENTION

1. Field of the Invention

The present invention relates to a control device for an automatic transmission, and particularly to slip control of a clutch or brake at a disengaged side when shifting up.

2. Description of the Related Art

Conventionally, automatic transmissions have been widely used as transmissions for automobiles etc. With these automatic transmissions, a turbine of a torque converter is made to rotate with the drive shaft of a prime mover such as an engine as input, and this rotation is converted to a specified gear ratio and conveyed to an output shaft by a planetary gear connected to a turbine shaft. A plurality of clutch or brake friction engagement devices are then provided between the turbine shaft and the output shaft in order to regulate movement of this planetary gear, and a gear ratio is switched by which friction engagement device is engaged from these plurality of friction engagement devices. Normally, the friction engagement device is switched according to input shaft rotation speed and extent of pressing on the accelerator to switch gear ratio.

Here, during a gear shift operation, a disengagement side engagement device that is in an engaged state is disengaged and an engagement side engagement device that is selected and in a disengaged state is engaged. Tightening force of these engagement devices is controlled hydraulically, with hydraulic pressure supplied to the disengagement side engagement device being gradually reduced, and hydraulic pressure supplied to the engagement side engagement device being gradually increased to shift gear.

At this time, if the time when hydraulic pressure supplied to the engagement side engagement device is increased is delayed compared to the time when hydraulic pressure supplied to the disengagement side engagement device is reduced, input torque becomes larger than the torque transmission capacity of the disengagement side engagement device and the engagement side engagement device, and the turbine rotation speed suddenly increases. On the other hand, if the time when hydraulic pressure supplied to the engagement side engagement device is increased is advanced compared to the time when hydraulic pressure supplied to the disengagement side engagement device is reduced, transmitted torque of the disengagement side engagement device and the engagement side disengagement device becomes larger than the input torque and the turbine rotation speed drops. This type of situation causes gear shift shock.

A technique has therefore been proposed to allow a disengagement side engagement device to slip by a specified amount before commencing inertia phase control in order to suppress gear shift shock. By allowing a disengagement side engagement device to slip by a specified amount, even if the time when the hydraulic pressure supplied to the engagement side engagement device is increased is early, this is absorbed by the slip of the disengagement side engagement device and gear shift shock is suppressed.

Japanese Patent Laid-open No. 2000-97324 discloses a control device for an automatic transmission for carrying out slip control of a disengagement side engagement device when shifting up by controlling hydraulic pressure supplied to a disengagement side engagement device and an engagement side engagement device. In this related art automatic transmission controller, hydraulic pressure supplied to one of either a disengagement side or an engagement side engagement device, for example an engagement side engagement device, is increased in line with a specified pattern. In this case, a target turbine rotation speed is set in order to cause specified slip in the disengagement side engagement device, and hydraulic pressure supplied to the disengagement side engagement device is controlled based on target turbine rotation speed and a gear shift model.

However, in this related art automatic transmission controller, in order to carry out slip control for the disengagement side engagement device, it is necessary to have slip amount responsiveness and precision with respect to a target value in the case of noise occurring, such as, for example, turbine torque variation or variation in coefficient of dynamic friction of the disengagement side engagement device, and there are problems such as not obtaining a sufficiently improved effect for gear shift shock and an increased time required for the gear shift operation.

SUMMARY OF THE INVENTION

The present invention has been conceived in view of the above described problems, and an object of the present invention is to provide a control device for an automatic transmission that improves responsiveness and precision of slip control of a disengagement side engagement device at the time of gear shift, better avoids gear shift shock and carries out the gear shift operation in a short time.

In order to achieve the above described object, according to a control device for an automatic transmission of the present invention, a slip control device, being a control device for an automatic transmission, comprising an input shaft for transmitting drive torque of a driving motor, an output shaft for conveying drive torque to a load, and a plurality of frictional engagement devices provided between the input shaft and the output shaft, and carrying out a gear shift operation by disengaging a disengagement side engagement device that is in an engaged state and engaging an engagement side engagement device that is disengaged among the plurality of frictional engagement devices, wherein drive torque of the driving motor is controlled at the time of gear shift to control slip amount of the disengagement side engagement device.

With the present invention, since drive torque of the driving motor is controlled at the time of gear shift to control slip amount of the disengagement side engagement device, responsiveness and precision of slip control for the disengagement side engagement device at the time of gear shift are improved, and it is possible to improve gear shift shock and to execute a gear shift operation in a shorter time.

It is also possible with the present invention to have an actuator for controlling coupling force of the friction engagement devices, with the slip control device controlling drive torque of the driving motor and coupling force of the disengagement side engagement device to control slip amount of the disengagement side engagement device. With this structure, since drive torque of the driving motor and coupling force of the disengagement side engagement device are controlled to control slip amount of the disengagement side engagement device, it is possible to further improve responsiveness and precision of slip control for the disengagement side engagement device at the time of gear shift, to obtain further improvement in gear shift shock and to execute a gear shift operation in an even shorter time.

The present invention is also suitable to situations where a driving motor is an engine or an electric motor.

BRIEF DESCRIPTION OF THE DRAWINGS

FIG. 2 is a drawing for describing gear shift steps achieved by meshing operation of the frictional engagement devices in an automatic transmission of an embodiment of the present invention.

DESCRIPTION OF THE PREFERRED EMBODIMENTS

A preferred embodiment of the present invention will now be described with reference to the drawings.

Figure 1:
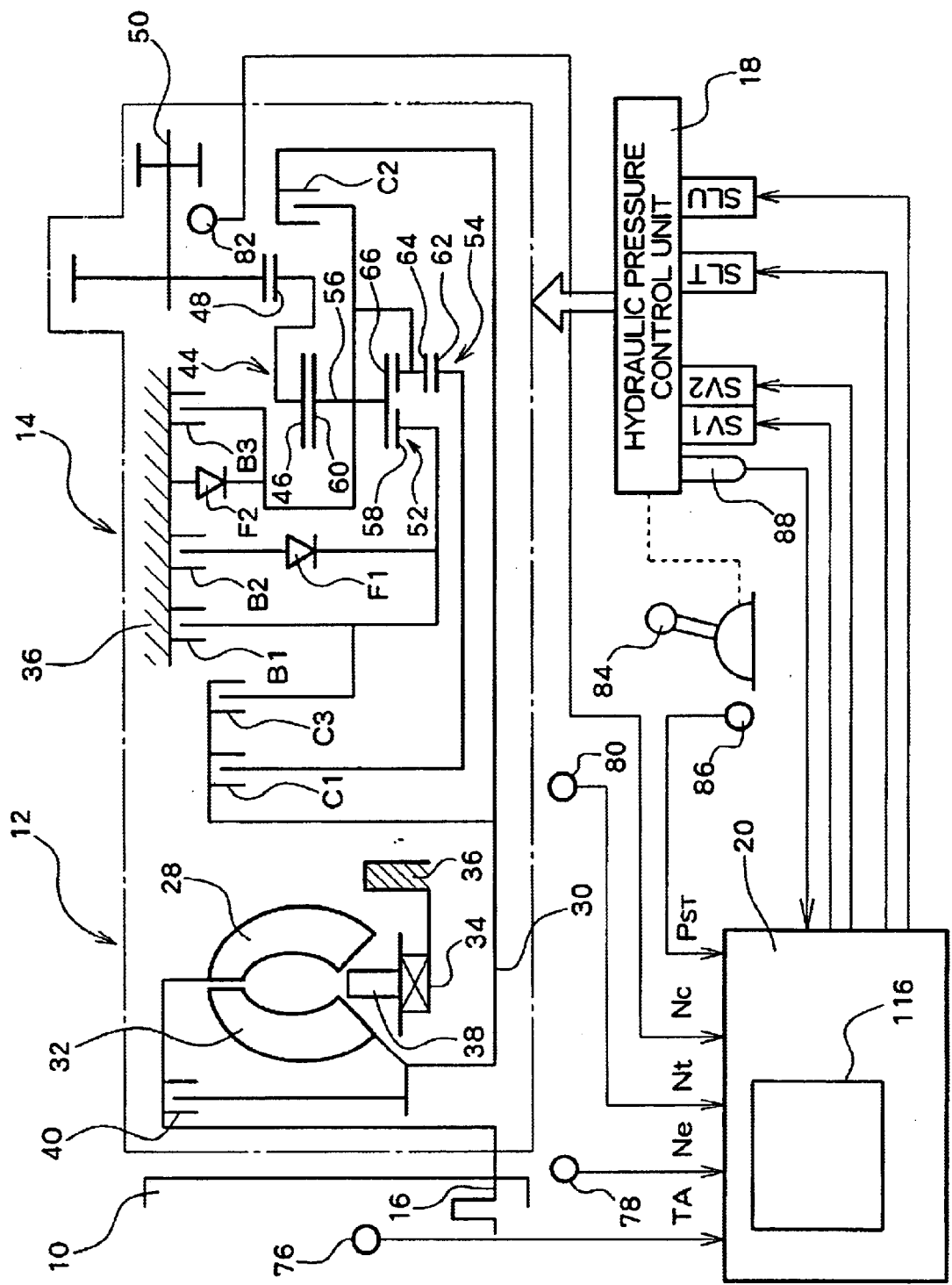
FIG. 1 is a drawing showing the structure of a drive force transmission unit for a vehicle including a controller of an automatic transmission of an embodiment of the present invention.

FIG. 1 is a drawing showing the structure of a drive force transmission unit for a vehicle including a control device of an automatic transmission of an embodiment of the present invention, comprising a torque converter 12 connecting to an output shaft 16 of an engine 10 as a driving motor, an automatic transmission 14, a hydraulic pressure control unit 18 for controlling gear shift steps of the automatic transmission 14, and an electronic control unit 20 for controlling hydraulic pressure of the hydraulic pressure control unit 18. Drive torque output from the engine 10 is transmitted to a drive wheel (not shown) via the torque converter 12, automatic transmission 14 and a differential gear (not shown).

The torque converter 12 comprises a pump impeller 28 connected to the output shaft 16 of the engine 10, a turbine liner 32 connected to an input shaft 30 of the automatic transmission 14 for transmitting drive torque from the pump impeller 28 by means of a fluid, a stator 38 fixed to a position fixed housing 36 by means of a one way clutch 34, and a lockup clutch 40 for connecting the pump impeller 28 and the turbine liner 32 via a damper (not shown).

The automatic transmission 14 is a multi-stage transmission with four forward gear stages and one reverse gear stage, and comprises the input shaft 30, a ravineaux type planetary gear 44, a ring gear 48 rotating together with a ring gear 46 of the ravineaux type planetary gear 44, and an output shaft 50 for transmitting drive torque to a differential gear (not shown).

The ravineaux type planetary gear 44 is configured with a carrier 56 and a ring gear 46 shared by a single pinion planetary gear 52 and a double pinion planetary gear 54. The single pinion planetary gear 52 is made up of a sun gear 58, a planetary gear 60 attached to the carrier 56 and a ring gear 46. The double pinion planetary gear 54 is made up of a sun gear 62, a first pinion gear 64 and a second pinion gear 66 integrally joined together and attached to the carrier 56 in a state capable of rotation.

Some of the structural elements of the single pinion planetary gear 52 and the double pinion planetary gear 54 are selectively connected together using clutches C1, C2 and C3 as three frictional engagement devices. Also, some of the structural elements of the single pinion planetary gear 52 and the double pinion planetary gear 54 are selectively connected to a housing 36 using brakes B1, B2 and B3 as three frictional engagement devices, and connected to the housing 36 rotating in one direction only using two one-way clutches F1 and F2.

The clutches C1, C2 and C3 and the brakes B1, B2 and B3, as the frictional engagement devices, realize four forward gears and a single reverse gear having respectively different gear ratios as shown in FIG. 2 (=rotation speed of the input shaft 30/rotation speed of the output shaft 50) by respectively controlling engaged/disengaged engagement states using the hydraulic pressure control unit 18. In FIG. 2, 1ST, 2ND, 3RD and 4TH respectively represent first gear, second gear, third gear and fourth gear on the forward drive side, and gear ratios become sequentially smaller from first gear to fourth gear. Also in FIG. 2, P, R, N, D, 2 and L represent ranges alternately selected by manual operation of the shift lever 84.

In FIG. 2, a ○ mark indicates an engaged or operating state, while a X mark indicates a disengaged or non-operating state. For example, a gear shift operation for executing a shift up from third gear to fourth gear in the D range is carried out by simultaneously executing a an engaging operation for brake B1 as an engagement side engagement device that is in a disengaged state, and a disengaging operation for clutch C1 as a disengagement side engagement device that is in an engaged state (In the following a gear shift operation causing disengagement of a disengagement side engagement device that is in an engaged state and engagement of an engagement side engagement device that is in a disengaged state will be called a clutch to clutch gear shift).

The hydraulic pressure control unit 18 is provided with two electromagnetic opening and closing valves SV1 and SV2 (FIG. 1) used to control gear stages of the automatic transmission 14, a linear solenoid valve SLT for causing generation of line hydraulic pressure P1 according to throttle opening amount TA detected by a throttle opening amount sensor 76 that will be described later, a linear solenoid valve SLU for generating hydraulic pressure in order to control an engaged state of the lockup clutch 40, and an oil temperature sensor 88 for detecting oil temperature TOIL of hydraulic oil inside the hydraulic pressure control unit 18.

Signals from a throttle opening amount sensor 76 for detecting throttle opening amount TA, an engine rotation speed sensor 78 for detecting rotation speed Ne of the engine 10, an input shaft rotation speed sensor 80 for detecting rotation speed Nt of the input shaft 30, an output shaft rotation speed sensor 82 for detecting rotation speed Nc of the output shaft 50, an operating position sensor 86 for detecting the operating position of the shift lever 84, namely one of the ranges P, R, N, D, 2 or L, and the oil temperature sensor 88 for detecting the oil temperature TOIL of the hydraulic oil inside the hydraulic pressure control unit 18 are input to the electronic control unit 20. The electronic control unit 20 processes the input signals and executes control etc. of the electromagnetic opening and closing valves SV1 and SV2, linear solenoid valves SLT, SLU, for example, based on processing results. The electronic control unit 20 is also provided with a slip control device 116 having a structure that will be described later in order to carry out slip control for the disengagement side engagement device at the time of a gear shift.

Next, the structure of the hydraulic pressure control unit 18 will be described using FIG. 3. A primary pressure generator 90 is provided with the linear solenoid valve SLT, and outputs line hydraulic pressure P1 to the shift valve unit 94 etc. as primary pressure of each of the frictional engagement devices C1, C2, C3, B1, B2, and B3 by regulating hydraulic oil pressure supplied from a hydraulic pump 92 driven to rotate by the engine 10 to a value that depends on engine load. A manual valve 96 is mechanically connected to the shift lever 84, and hydraulic pressure corresponding to a selected driving range is output to the shift valve unit 94 by switching line hydraulic pressure P1 depending on the traveling range of the shift lever 84. Also, the electromagnetic opening and closing valves SV1 and SV2 are operated by a command from the electronic control unit 20 in order to select a gear stage, and output a signal pressure to the shift valve unit 94.

Although not shown, the shift valve unit 94 comprises a 1-2 shift valve, a 2-3 shift valve and a 3-4 shift valve switched and operated at the time of gear shift based on hydraulic pressure according to a driving range from the manual valve 96 and pressure signals from the electromagnetic opening and closing valves SV1 and SV2, and selectively supplies engagement hydraulic pressure to each of the frictional engagement devices C1, C2, C3, B1, B2 and B3 in accordance with the operation shown in FIG. 2. Accumulators AC1, AC2, AC3, AB1 and AB2 for relieving these supplied pressures, namely rise in coupling force, are respectively connected via an oil path to the frictional engagement devices C1, C2, C3, B1 and B2. Line pressure P1 controlled using commands from the electronic control unit 20 is respectively supplied to each of the accumulators AC1, AC2, AC3, AB1 and AB2 as accumulator back pressure, and by regulating this line pressure P1, gear shift transition control is carried out to regulate supplied hydraulic pressure of each of the frictional engagement devices within a gear shift transition period that will be described later.

In this embodiment, at the time of a shifting up clutch to clutch gear shift, slip control is carried out for the disengagement side engagement device. In that case disengagement side engagement device slip control is carried out by controlling engine torque.

Figure 4:
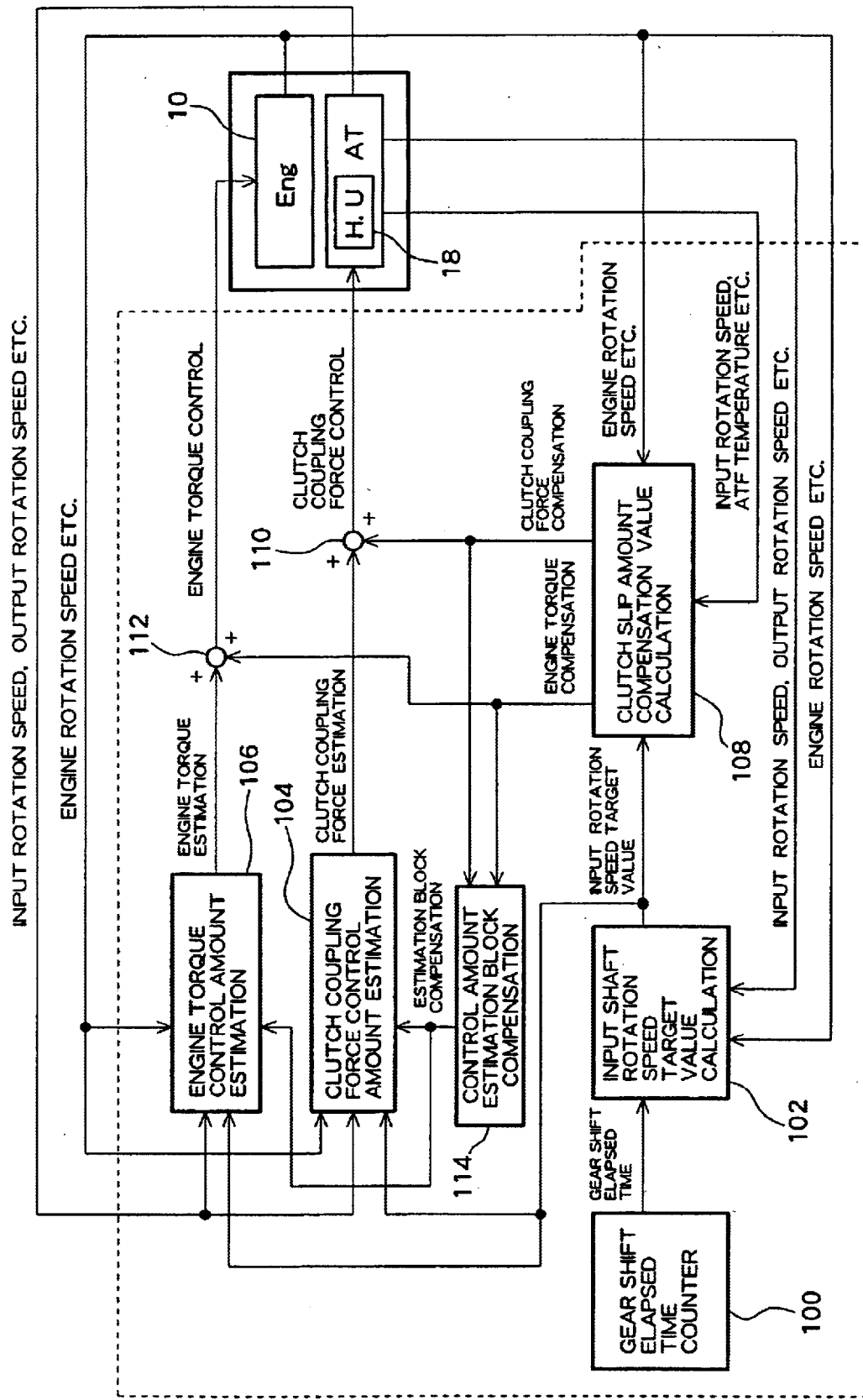
FIG. 4 is a block diagram showing the structure of a slip control unit for carrying out slip control of a disengagement side engagement device inside an electronic control unit of an embodiment of the present invention.

Next, the structure of the slip control unit 116 inside the electronic control unit 20 for carrying out slip control for the disengagement side engagement device during a gear shift operation will be described using the block diagram of FIG. 4. Here, the case of slip control of the clutch C1 when shifting up from third gear to fourth gear by causing the clutch C1 to disengage while engaging the brake B1 will be described as an example.

A gear shift elapsed time counter 100 has an internal counter, and performs a count of gear shift elapsed time from output of a gear shift command every specified time. Once the gear shift operation is complete the counter is reset.

In an input shaft rotation speed target value calculating block 102, signals representing gear shift elapsed time, rotation speed Ne of the engine 10, rotation speed Nt of the input shaft 30 of the automatic transmission 14 and rotation speed Nc of the output shaft 50 etc. are input and a target value Nr for rotation speed of the input shaft 30 is calculated. Here, a target value currently desired to control is slip speed of the clutch C1 as a disengagement side engagement device, but since rotation speed Nt of the input shaft 30 is obtained from slip speed of the brake clutch C1, rotation speed Nc of the output shaft 50 and a number of teeth of each gear constituting the ravineaux type planetary gear 44, here the target value Nr for rotation speed of the input shaft 30 is set from a target value for the slip speed of the clutch C1.

Signals representing rotation speed Ne of the engine 10, rotation speed Nt of the input shaft 30 of the automatic transmission 14, rotation speed Nc of the output shaft 50 and a target value Nr for rotation speed of the input shaft 30 etc. are input to a clutch coupling force control amount estimation block 104. A target value for transmission torque of the brake B1, as the engagement side engagement device, and the clutch C1, as the disengagement side engagement device, is calculated, and a clutch coupling force control amount estimation value for controlling transmission torque of the brake B1 and the clutch C1 to the target value is output. In order to control transmission torque of the brake B1 and the clutch C1, hydraulic pressure is supplied to the brake B1 and the clutch C1. Here, the following relationship exists between transmission torque T of the frictional engagement devices and hydraulic pressure P supplied to the frictional engagement devices.

$$T = (S \times P - F) \times \mu \times r \times z \quad (1)$$

In this equation, S is piston area subjected to pressure, F is return spring set load, $\mu$ is coefficient of friction, r is facing effective radius, and z is number of facing operation surfaces.

Figure 3:
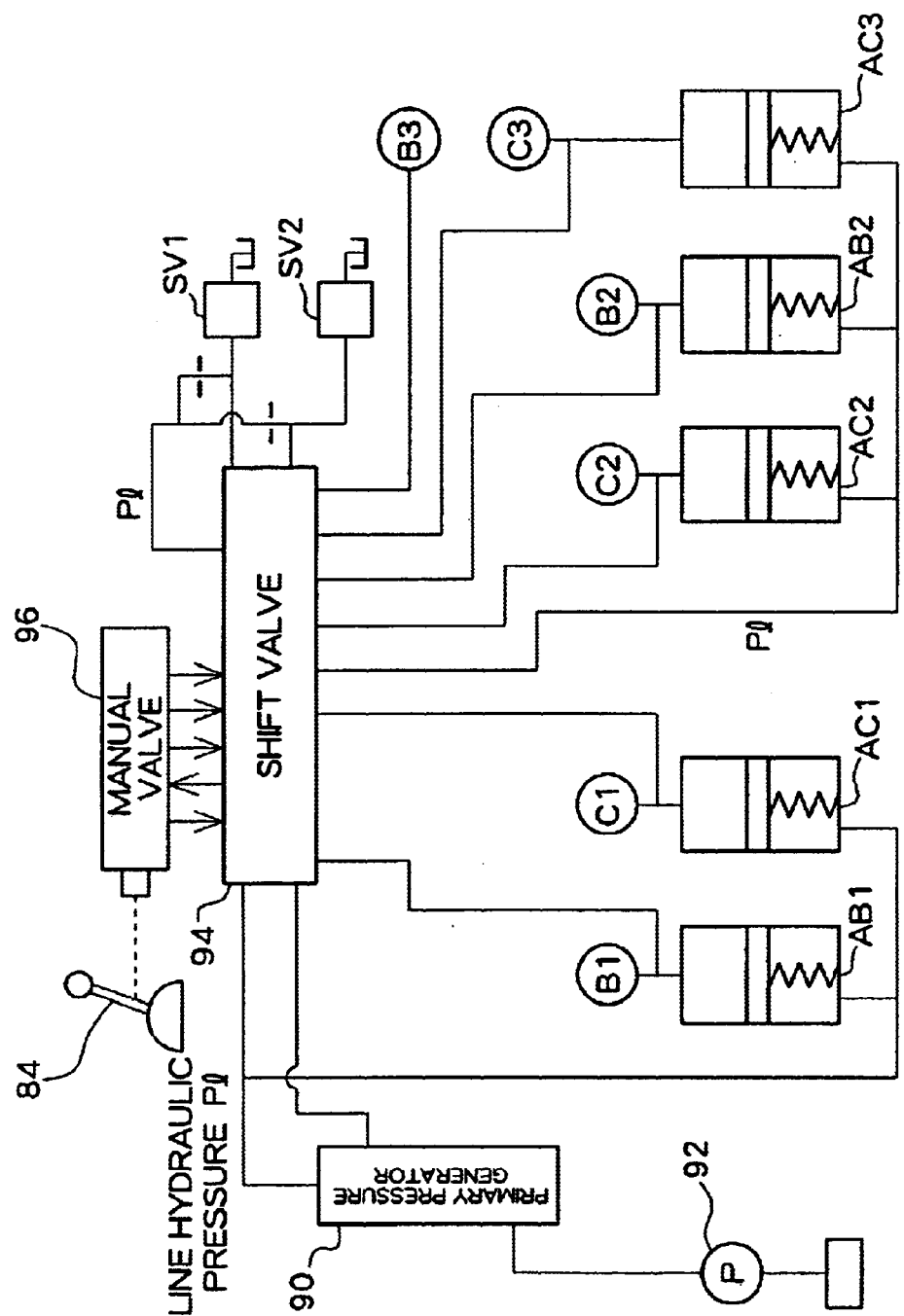
FIG. 3 is a drawing schematically showing the structure of a hydraulic pressure control unit of an embodiment of the present invention.

With the hydraulic pressure control unit 18 shown in FIG. 3, supplied line hydraulic pressure P1 is controlled as back pressure of the accumulators AB1 and AC1 in order to control hydraulic pressure supplied to the brake B1 and the clutch C1. Accordingly, a clutch coupling force control amount estimation value output from the clutch coupling force control amount estimation block 104 becomes a command value for control of line hydraulic pressure P1.

In an engine torque control amount estimation block 106, signals representing rotation speed Ne of the engine 10, rotation speed Nt of the input shaft 30 of the automatic transmission 14, rotation speed Nc of the output shaft 50 and a target value Nr for rotation speed of the input shaft 30 etc. are input. A target value for engine torque is then calculated and an engine torque control amount estimation value for controlling engine torque to the control value is output. In order to control engine torque, for example, ignition timing adjustment (only torque reduction), valve timing adjustment using a variable valve timing mechanism, throttle opening amount adjustment using an electronically controlled throttle, and fuel injection amount adjustment are carried out. The engine torque control amount estimation value therefore becomes a command value for carrying out these control operations.

Here, if rotation speed of the input shaft 30 is Nt, torque of the engine 10 is Te, transmission torque of the brake B1 is Tb and transmission torque of the clutch C1 is Tc, then the following equation is established.

$$dNt/dt = A \times t(e) \times Te + B \times Tb + C \times Tc \quad (2)$$

t(e) is a torque ratio of the torque converter 12, and is a value determined depending on a speed ratio e(=Nt/Ne). A, B and C are constants determined from inertia of the input shaft 30 and number of teeth of each of the gears constituting the ravineaux type planetary gear 44 etc. Also, with respect to the term A×t(e)×Te, this can be entered taking into consideration an inertial torque component. Equation 2 represents determination of variation of rotational speed of the input shaft 30 over time dNt/dt (rotational acceleration) using torque Te of the engine 10, torque ratio t (e), transmission torque Tb of the brake B1 and transmission torque Tc of the clutch C1, and so it is possible, for example, to set a target value for rotational acceleration of the input shaft 30 from deviation between rotation speed Nt of the input shaft 30 and the target value Nr for rotational speed of the input shaft 30, and to set respective target values for torque of the engine 10, transmission torque of the brake B1 and transmission torque of the clutch C1 from the target value for rotational acceleration of the input shaft 30 and equation 2. These target values can be set to any value as long as equation 2 is satisfied.

Signals representing rotation speed Ne of the engine 10, rotation speed Nt of the input shaft 30 of the automatic transmission 14, a target value Nr for rotational speed of the input shaft 30 and oil temperature TOIL of hydraulic fluid in the hydraulic pressure control unit 18 etc. are input to a clutch slip amount compensation value calculating section 108. Here, a deviation between target value Nr for rotational speed of the input shaft 30 of the automatic transmission 14 and rotation speed Nt of the input shaft 30 is calculated, and based on this deviation amount a clutch coupling force control amount compensation value for compensating control of transmission torque of the brake B1 and the clutch C1, specifically control of line hydraulic pressure P1, and an engine torque control amount correction value for compensating control of engine torque are calculated and output. Each control amount compensation value is obtained by, for example, proportional compensation of a deviation amount between Nr and Nt. Compensation gain for each of the control amount correction values can be arbitrarily set. After clutch coupling force control amount estimation values and clutch coupling force control amount compensation values for the brake B1 and the clutch C1 are added by an adder 110, the result is input to the hydraulic pressure control unit 18. Transmission torque for the brake B1 and the clutch C1, namely the line hydraulic pressure P1, is controlled at the hydraulic pressure control unit 18 based on this added clutch coupling force control amount. Also, the engine torque control amount estimation value and the engine torque control amount compensation value are added by an adder 112 and input to the engine 10. Engine torque is controlled at the engine 10 based on this added engine torque control amount.

The clutch coupling force control amount compensation value and the engine torque control amount compensation value are input to a control amount estimation block compensation block 114. A control map for calculating a clutch coupling force control amount estimation value inside the clutch coupling force control amount estimation block 104 and a control map for calculating engine torque control amount estimation value inside the engine torque control amount estimation block 106 are then respectively amended so that the clutch coupling force control amount compensation value and the engine torque control amount compensation value respectively become minimum.

Figure 5:
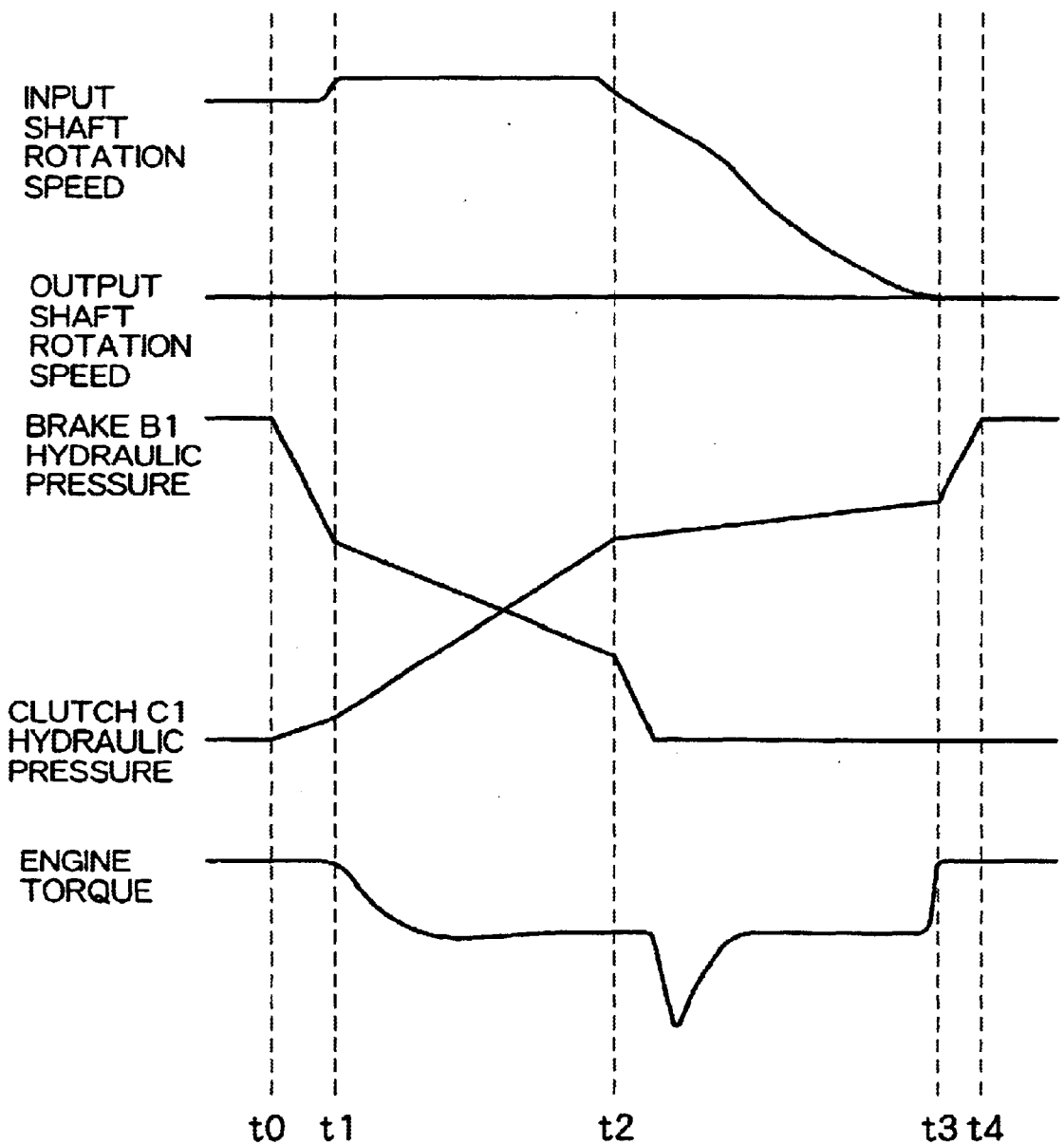
FIG. 5 is a timing chart showing variation over time of input shaft rotation speed, output shaft rotation speed, supplied hydraulic pressure of a disengagement side engagement device, supplied hydraulic pressure of an engagement side engagement device, and engine torque, in an automatic transmission control unit of an embodiment of the present invention.
Figure 5:
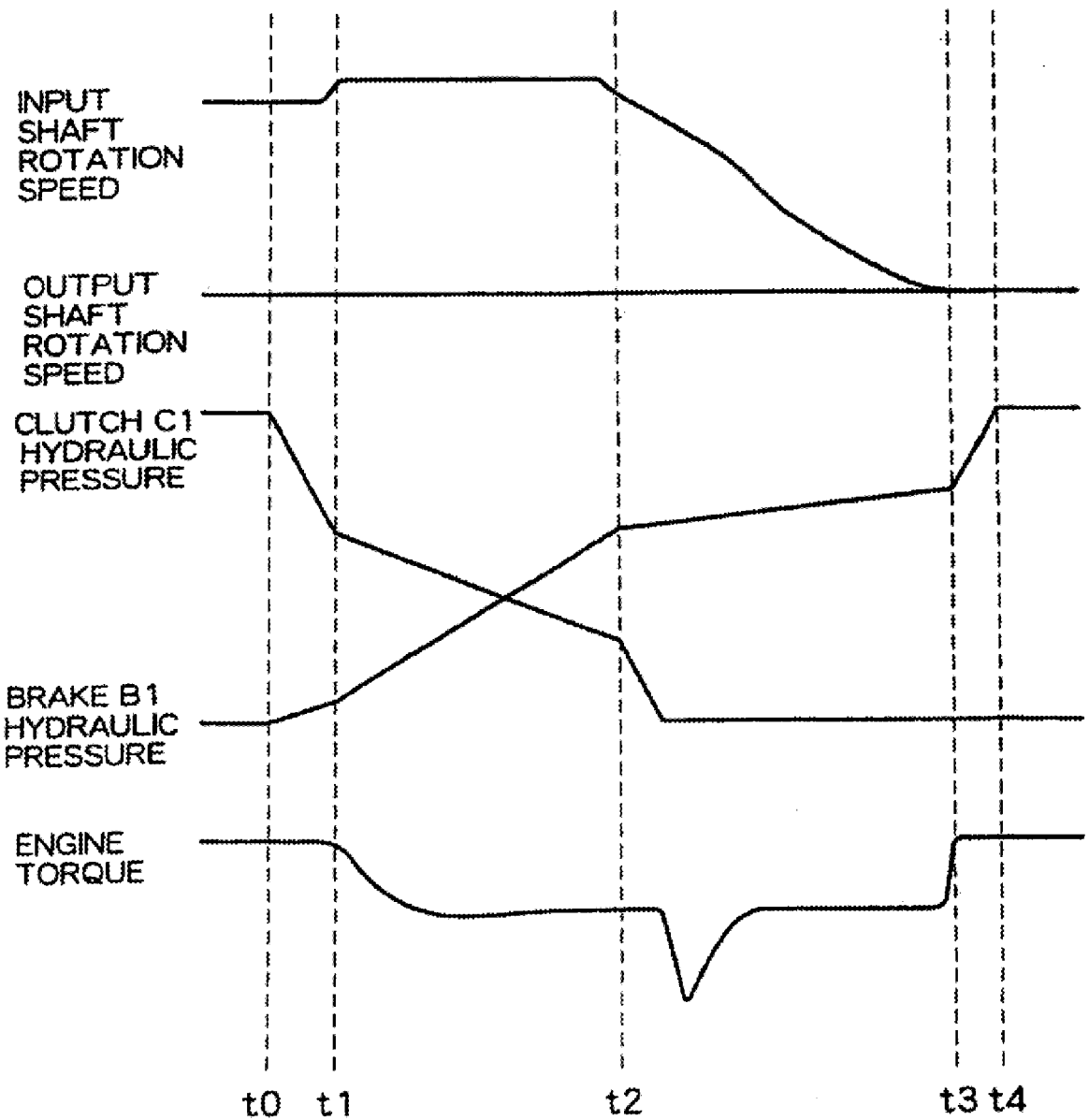

Next, operation of this embodiment will be described using FIG. 5. Here, a case is described where a shift up from third gear to fourth gear by disengaging the clutch C1 while engaging the brake B1. FIG. 5 shows variation over time of input shaft 30 rotation speed Nt, output shaft 50 rotation speed Nc, supplied hydraulic pressure of the brake B1, supplied hydraulic pressure of the clutch C1, and engine torque. Here the rotation speed Nc of the output shaft 50 is considered to be constant. Also, in FIG. 5 for convenience of the description the rotation speed Nc of the output shaft 50 is a value such that upon completion of a gear shift to the fourth gear stage the rotation speed Nt of the input shaft 30 and the rotation speed Nc of the output shaft 50 are made coincident using a value that is corrected with a gear ratio of the fourth gear stage.

If a gear shift operation command is output (time t0 in FIG. 5), a hydraulic path is switched from the shift valve unit 94 to each of the frictional engagement devices using the electromagnetic opening and closing valve SV2 to cause an increase in hydraulic pressure supplied to the brake B1 and cause a decrease in hydraulic pressure supplied to the clutch C1. However, in this case line hydraulic pressure P1 supplied as back pressure of the accumulators AB1 and AC1 is regulated so that slip rises in the clutch C1 and the rotation speed Nt of the input shaft 30 rises. If the hydraulic pressure supplied to the clutch C1 is decreased to make transmission torque capacity of the clutch C1 smaller than the torque Tt of the input shaft 30, the clutch C1 starts to slip and the rotation speed Nt of the input shaft 30 rises to be increased compared to the rotational speed before slip of the clutch C1.

Slip control for the clutch C1 is then commenced from the point in time where slip of the clutch C1 commences, namely the point in time where the rotation speed Nt of the input shaft 30 has risen (time t1 in FIG. 5). When carrying out slip control for the clutch C1 a target value Nr for rotational speed of the input shaft 30 is set in order to cause a specified slip speed in the clutch C1. Hydraulic pressure supplied to the brake B1 and the clutch C1 and the engine torque are then controlled so that rotation speed Nt of the input shaft 30 coincides with the target value Nr. Here, supplied hydraulic pressure to the brake B1 and the clutch C1 is carried out by controlling line pressure P1 being supplied as back pressure of the accumulators AB1 and AC1. For example, in the case where line pressure P1 has been caused to decrease, there is a large amount of variation in decrease of hydraulic pressure to the clutch C1 over time, and a small amount of variation over time of increase in hydraulic pressure to the brake B1. If rotation speed Nt of the input shaft 30 is larger than the target value Nr, control is carried out to decrease engine torque or increase line pressure P1. On the other hand, if the rotation speed Nt of the input shaft 30 is smaller than the target value Nr, control is carried out to increase engine torque or decrease line hydraulic pressure P1. In FIG. 5, the case of controlling engine torque to decrease less than a value at the start of a gear shift operation is illustrated as a control example.

If supplied hydraulic pressure to the brake B1 is increased and the supplied hydraulic pressure to the clutch C1 is increased while carrying out slip control for the clutch C1 in this way, the input shaft 30 is soon drawn in the direction of the fourth gear stage. Specifically, the rotation speed Nt of the input shaft 30 becomes smaller than a value that is the rotation speed Nc of the output shaft 50 multiplied by the gear ratio of the third gear stage. At that point in time (time t2 in FIG. 5), slip control of the clutch C1 using the engine torque of this embodiment is completed, and supplied hydraulic pressure to the clutch C1 is controlled to become a minimum hydraulic pressure. Supplied hydraulic pressure to the brake B1 is then regulated to gradually increase and draw the input shaft 30 in the direction of the fourth gear stage. Shortly after that, if the rotation speed Nt of the input shaft 30 coincides with a value that is the rotation speed Nc of the output shaft 50 multiplied by the gear ratio of the fourth gear stage, drawing of the input shaft 30 in the direction of the fourth gear stage is terminated and supplied hydraulic pressure to the brake B1 is increased up to a specified value and the gear shift operation is completed (time t4 in FIG. 5).

In this embodiment, when carrying out slip control for a disengagement side engagement device, namely control of rotation speed Nt of the input shaft 30, in a clutch to clutch gear shift, engine torque is also controlled as well as supplied hydraulic pressure to a disengagement side engagement device and an engagement side engagement device. Control of rotation speed Nt of the input shaft 30 using engine torque has much better responsiveness than control of rotation speed Nt of the input shaft 30 using supplied hydraulic pressure to the disengagement side engagement device and the engagement side engagement device, which means that even if a disturbance, such as variation in coefficient of dynamic friction of the disengagement side engagement device, arises it is possible to cause rotation speed Nt of the input shaft 30 to rapidly follow the target value Nr by controlling engine torque. Accordingly, it is possible to improve responsiveness and precision of slip control for a disengagement side engagement device at the time of a gear shift operation, and it is possible to better avoid gear shift shock and execute a gear shift operation in a short period of time.

In this embodiment, description has been given for an engine as a driving motor, but the present invention is also applicable to a case where an electric motor is used as a driving motor. However, in the case where a driving motor is an electric motor, slip speed for a disengagement side engagement device is controlled by controlling electric motor current instead of engine torque. With respect to control using electric motor current also, similarly to the control using engine torque, responsiveness is much better than control using hydraulic pressure. Also, the structure of the automatic transmission is not limited to that shown in FIG. 1, and the present invention is also applicable to any automatic transmission for carrying out a clutch to clutch gear shift. The structure of the hydraulic circuit is also not limited to that shown in FIG. 3, and the present invention is applicable to any hydraulic circuit as long as it is capable of regulating hydraulic pressure supplied to a frictional engagement device.

As has been described above, according to the present invention drive torque of a driving motor is controlled at the time of a gear shift operation to control slip amount of a disengagement side engagement device, which means that responsiveness and precision of slip control of the disengagement side engagement device at the time of gear shift operation are improved, and it is possible to improve gear shift shock and perform a gear shift in a short period of time.

What is claimed is:

1. A slip control device, being a control device for an automatic transmission, comprising an input shaft for transmitting drive torque of a driving motor, an output shaft for conveying the drive torque to a load, and a plurality of frictional engagement devices provided between the input shaft and the output shaft, and carrying out a gear shift operation by disengaging a disengagement side engagement device that is in an engaged state and engaging an engagement side engagement device that is disengaged among the plurality of frictional engagement devices, wherein the drive torque of the driving motor is controlled at the time of gear shift to control slip amount of the disengagement side engagement device, slip control for the disengagement side engagement device, using the driving motor, is commenced when the disengagement side engagement device starts to slip.

2. The control device for the automatic transmission as disclosed in claim 1, having an actuator for controlling coupling force of the friction engagement devices, the slip control device controlling the drive torque of the driving motor and the coupling force of the disengagement side engagement device to control the slip amount of the disengagement side engagement device.

3. The control device for the automatic transmission as disclosed in claim 1, wherein the driving motor is an engine or an electric motor.

* * * * *

UNITED STATES PATENT AND TRADEMARK OFFICE
CERTIFICATE OF CORRECTION

PATENT NO. : 6,866,612 B2　　　　　　　　　　　　　　　　　　　　　　　　　Page 1 of 2
APPLICATION NO. : 10/319612
DATED : March 15, 2005
INVENTOR(S) : Takaaki Tokura et al.

It is certified that error appears in the above-identified patent and that said Letters Patent is hereby corrected as shown below:

Replace Figure 5 with attached Replacement Figure 5.

Please replace the old drawings with these new drawings attached here.

Signed and Sealed this

Fifth Day of February, 2008

JON W. DUDAS
*Director of the United States Patent and Trademark Office*